UNITED STATES PATENT OFFICE.

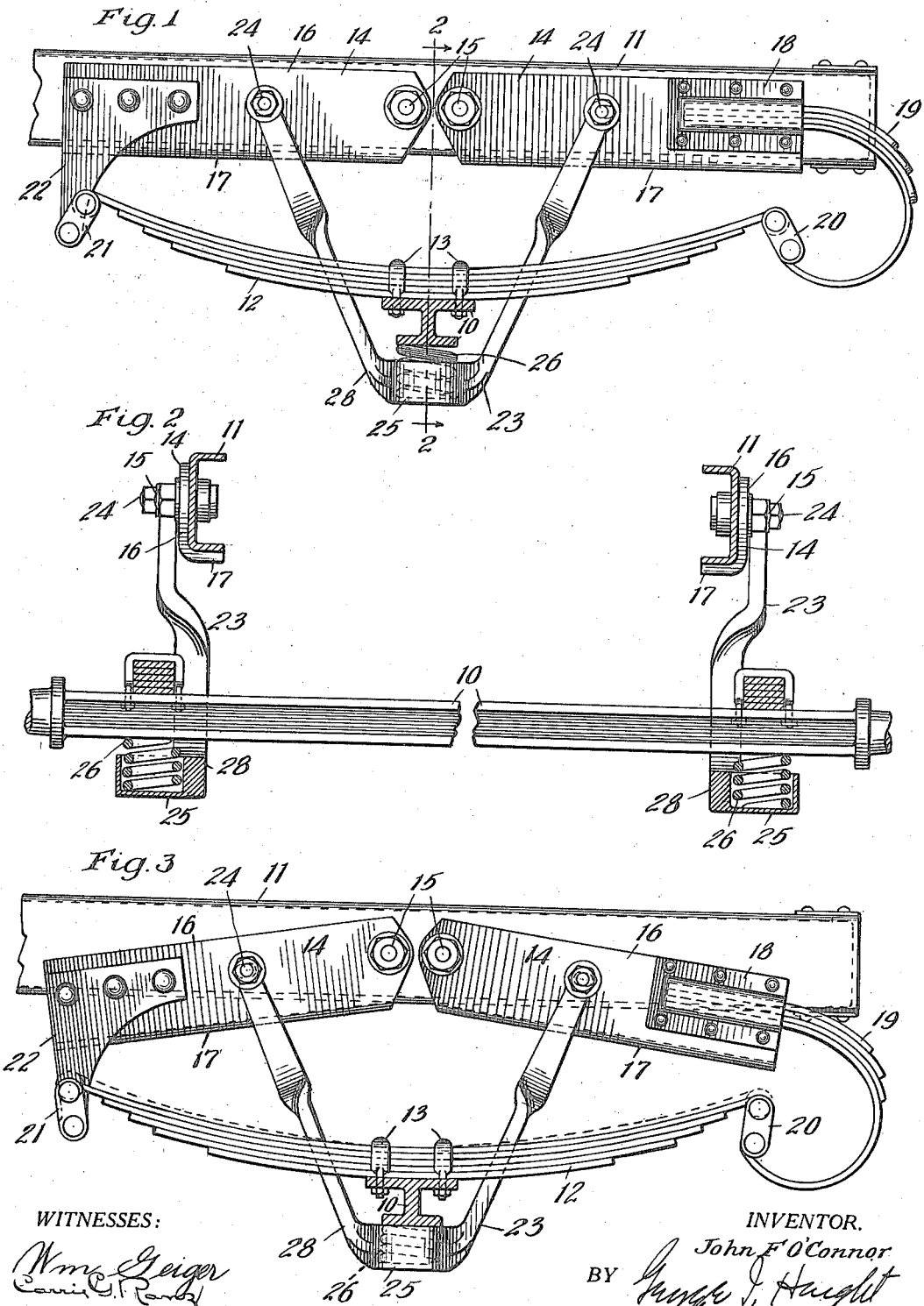

JOHN F. O'CONNOR, OF CHICAGO, ILLINOIS, ASSIGNOR TO WILLIAM H. MINER, OF CHAZY, NEW YORK.

SPRING SUSPENSION.

1,181,919.   Specification of Letters Patent.   Patented May 2, 1916.

Application filed July 25, 1914. Serial No. 852,996.

*To all whom it may concern:*

Be it known that I, JOHN F. O'CONNOR, a citizen of the United States, residing at Chicago, in the county of Cook and State of Illinois, have invented a certain new and useful Improvement in Spring Suspensions, of which the following is a full, clear, concise, and exact description, reference being had to the accompanying drawings, forming a part of this specification.

This invention relates to improvements in spring suspensions, and more particularly to spring suspensions for vehicles such as automobiles and the like.

The main object of the invention is to provide a spring suspension suitable for automobiles and the like in which the main shock absorbing spring usually interposed between the axle and the frame or chassis is operated in the same direction and manner to absorb the main or primary shocks and also the recoil. Or, stated in another way, to so arrange the spring suspension that the spring is compressed or flexed in the same direction when the frame or chassis moves from normal toward the axle and also when it moves from normal away from the axle.

The invention furthermore consists in improvements in the parts and devices and in the novel combinations of the parts and devices herein shown, described or claimed.

In the drawing forming a part of this specification, Figure 1 is a part side elevation, part vertical section showing my improvement in connection with the chassis of an automobile; Fig. 2 is a vertical transverse section showing parts of the chassis and axle of an automobile and taken substantially on line 2—2 of Fig. 1; and Fig. 3 is a view similar to Fig. 1, showing the manner in which the spring is compressed or flexed in absorbing the recoil of the body or chassis of the vehicle.

The axle is designated by the reference 10, and the same may be of any well known or suitable form; 11—11 denote the side members of the chassis or vehicle body or frame, the normal position of which, relative to the axle 10, is shown in Fig. 1. Interposed between the chassis and the axle, one at each end of the latter, are half elliptical springs 12, each of which comprises a plurality of plates assembled in the usual manner and secured to the axle, as by means of fasteners or clips 13—13. Inasmuch as the arrangement is the same at each end of the axle, it will only be necessary to describe the construction at one end thereof. To each side member 11 of the chassis or frame are pivoted two levers 14, each of which is pivoted at a point substantially in vertical alinement over the axle, as indicated at 15. Each of said levers 14 is substantially of L-shape in cross section, the vertical wall 16 thereof slidably engaging the side of the member 11, and the horizontal bottom inwardly extended flange 17 thereof engaging the underside of the member 11. As shown in Fig. 1, the right-hand lever 14 is provided with a clamp plate 18 by which the spring 19 is secured thereto, the spring 19 being attached to the spring 12, as by means of a pivoted link or hanger 20. The left-hand lever 14, as viewed in Fig. 1, is provided with a depending bracket or extension 22 which is pivotally connected to the opposite end of the spring 12, as by means of another link or hanger 21.

A substantially V-shaped loop 23 is provided which extends under the axle 10 and has the ends of the arms thereof pivotally connected to the levers 14—14, as indicated at 24, the pivotal connection being arranged between the pivotal connection 15 and the ends of the levers 14. The substantially V-shaped loop 23, at the bottom thereof, is provided with a pocket 25 for a short coil spring 26 interposed between the loop and the under side of the axle 10, the loop 23 being spaced from the axle 10 in normal position of the parts, as clearly indicated in Fig. 1.

The operation of the device is as follows: When the automobile or other vehicle strikes a rut or depression in the roadway, the body or chassis naturally moves toward the axle, and during such movement the spring 12 will be compressed or flexed downwardly, due to the fact that the levers 14—14 engaging with the under sides of the side members 11—11 move with the latter and force the ends of the spring 12 downwardly, and during such movement the loop 23 also moves downwardly bodily with the frame or chassis. Upon the recoil the parts return in the usual manner until they reach the normal position indicated in Fig. 1, the spring 12 being thereby released and allowed to assume normal position. Upon a continuation of the recoil of the chassis or frame, the loop 23 will be moved upwardly until the spring 26 is compressed, whereupon movement of the loop 23 relatively to the axle 10 is prevented. As the frame or chassis continues its upward movement, the pivotal connections 24—24 serve as fulcrums for the levers 14—14 so that the levers 14—14 are tilted and have their outer ends forced downwardly, as indicated in Fig. 3. This movement obviously causes the spring 12 to be compressed or flexed in the same manner that it was during the absorption of the primary or main shock. Such compression is indicated in Fig. 3, the dotted line showing the normal position of the upper face of the spring, and the full lines showing the spring 12 flexed or compressed when the chassis or frame has moved up above its normal position. The spring 26 is a relatively light spring and is provided to lightly retard the upward movement of the chassis for a short distance and before the levers 14—14 are brought into action. In order to render the arms of the loop 23 flexible, the lower ends thereof have the longest dimensions extending parallelly to the axle 10, as indicated at 28.

I have herein shown and described what I now consider the preferred embodiment of my improvement, but I am aware that the invention may be embodied in various other arrangements to obtain the same result and advantages, and I do not wish to be limited by the description and drawing forming a part of this specification, but contemplate all the structures and arrangements coming within the scope of the claims appended hereto.

I claim:—

1. In a spring suspension, two relatively movable members, a spring, said spring secured to one of said members having one end thereof flexed to compress it when said members approach each other, a lever pivoted to the other of said members, a relatively stationary fulcrum for said lever intermediate its ends and which remains substantially at a fixed distance from the member to which said spring is secured when the parts move away from each other from normal position, and means connecting said lever to said spring.

2. In a spring suspension for vehicles, the combination with the frame, axle, and plate spring interposed therebetween, said spring being secured to the axle, of a lever pivotally connected with both the frame and spring, and means for forming a fulcrum for said lever which is fixed with respect to the axle when the frame moves away from the axle, said fulcrum being located intermediate the pivotal connection between said lever and the frame and spring.

3. In a spring suspension for vehicles, the combination with the axle, a member of the frame and a plate spring secured to the axle, of a lever pivotally connected at one end thereof to said frame member and pivotally connected at its other end to the plate spring, and a member pivotally connected to said lever intermediate its ends and extending under the axle and adapted to engage the latter.

4. In a spring suspension for vehicles, the combination with the frame, axle and spring secured to the axle, of a lever pivotally connected to the frame, said lever having a portion thereof adapted to engage the under side of the frame to thereby cause the lever to move downward upon downward movement of the frame, said lever being also connected to the spring, and means extending from said lever to the axle and arranged to form a fulcrum for the lever upon upward movement of the frame.

5. In a spring suspension for vehicles, the combination with a member of the frame, an axle and a plate spring secured to the axle, of means for connecting the frame to the spring including a pair of oppositely extended levers pivoted to the frame member and also attached to the spring, and a loop pivotally connected to the levers and extending beneath the axle and arranged to engage the latter upon upward movement of the frame.

6. In a spring suspension for vehicles, the combination with the axle, frame and half elliptical spring secured to the axle, of means for applying forces to the ends of said spring when the frame moves toward the axle, said means including oppositely arranged pivoted levers connected to the ends of said spring, and means for causing said levers to flex said spring in the same direction and manner when the frame moves above its normal position relatively to the axle.

7. In a spring suspension for vehicles, the combination with the frame, axle and plate spring secured to the axle, of a pair of levers pivotally connected to the frame at points substantially in vertical alinement over the axle, said levers at their free ends being pivotally connected with the ends of the spring, and a loop extending beneath said axle, said loop having the ends thereof connected to the levers.

8. In a spring suspension for vehicles, the combination with the frame, axle and plate spring secured to the axle, of a pair of levers pivotally connected to the frame at points substantially in vertical alinement over the axle, said levers at their free ends being pivotally connected with the ends of the spring, a loop extending beneath said axle, said loop having the ends thereof connected to the levers, and a cushioning spring interposed between the loop and the axle.

9. In a device of the character described, the combination with the frame, axle, and spring, of a lever pivotally connected at one end to said frame and at its opposite end to said spring, said lever having a shouldered portion engaged by the frame, whereby the lever is moved downwardly simultaneously upon downward movement of the frame, and a relatively stationary fulcrum for said lever intermediate its ends, upon relative separation of the frame and axle.

JOHN F. O'CONNOR.

Witnesses:
CARRIE G. RANZ,
ARLINE R. ARNOLD.